United States Patent
Pesach

(10) Patent No.: US 8,820,593 B2
(45) Date of Patent: Sep. 2, 2014

(54) REMOVABLE WATER BAR FOR VEHICLES

(75) Inventor: Moshe Pesach, Gan Yavne (IL)

(73) Assignee: Aqua Car Ltd., Gan Yavne (IL)

( * ) Notice: Subject to any disclaimer, the term of this patent is extended or adjusted under 35 U.S.C. 154(b) by 0 days.

(21) Appl. No.: 13/568,925

(22) Filed: Aug. 7, 2012

(65) Prior Publication Data

US 2014/0042187 A1  Feb. 13, 2014

(51) Int. Cl.
*B60P 3/22* (2006.01)

(52) U.S. Cl.
USPC ..... 222/608; 222/129; 222/129.1; 222/146.5; 222/146.1; 222/1

(58) Field of Classification Search
CPC ... B60N 3/18; B67D 1/04; B67D 2210/00136
USPC ........ 222/146.1, 146.2, 146.6, 608, 610, 129, 222/129.1, 192, 146.5; 219/202
See application file for complete search history.

(56) References Cited

U.S. PATENT DOCUMENTS

| | | | | |
|---|---|---|---|---|
| 2,975,797 A | * | 3/1961 | Matheney | 137/334 |
| 3,642,023 A | | 2/1972 | Rembert | |
| 4,140,150 A | * | 2/1979 | Rundell | 137/340 |
| 4,913,318 A | * | 4/1990 | Forrester | 222/129 |
| 5,497,918 A | * | 3/1996 | Brilanchik | 222/626 |
| 6,076,706 A | * | 6/2000 | Kritchman | 222/146.6 |
| 6,123,010 A | | 9/2000 | Blackstone | |
| 6,460,361 B1 | * | 10/2002 | Faria | 62/239 |
| 7,108,094 B2 | * | 9/2006 | Daniels | 180/90 |
| 8,322,574 B1 | * | 12/2012 | Phillips | 222/146.1 |
| 2008/0110931 A1 | * | 5/2008 | Prabucki | 222/146.1 |
| 2008/0256972 A1 | * | 10/2008 | Knoll et al. | 62/376 |
| 2009/0078724 A1 | * | 3/2009 | Lamb et al. | 222/608 |
| 2010/0049362 A1 | * | 2/2010 | Hatuka | 700/232 |

FOREIGN PATENT DOCUMENTS

| | | |
|---|---|---|
| WO | WO 2004/014739 | 2/2004 |
| WO | WO 2008/075346 | 1/2008 |
| WO | WO 2009/023712 | 2/2009 |

OTHER PUBLICATIONS

International Search Report of Application No. PCT/IL2013/050595 dated Oct. 29, 2013.

* cited by examiner

*Primary Examiner* — Paul R Durand
*Assistant Examiner* — Jeremy W Carroll
(74) *Attorney, Agent, or Firm* — Pearl Cohen Zedek Latzer Baratz LLP

(57) ABSTRACT

A water dispensing system for an automobile includes a docking mechanism in a trunk of the car to detachably hold a water bar that is linked by a water pipe to supply water to a water dispenser in a cabin of the automobile. The water bar includes a rechargeable power unit to provide power to the water bar when the water bar is removed from the automobile.

17 Claims, 3 Drawing Sheets

REMOVABLE WATER BAR FOR VEHICLES

BACKGROUND OF THE INVENTION

Accessories for tail gate parties, picnics, mobile vacations, camping and other recreational activities have become more prevalent and more sophisticated as consumers seek to bring the comforts and conveniences of home to these away-from-home events. The availability of hot and cool drinks in the car and away from the car is, therefore, a desired amenity.

SUMMARY OF THE INVENTION

Embodiments of the invention may include a fluid, such as water, dispensing system for a vehicle such as an automobile, boat, truck, camper, plane or other vehicle, where the system includes a docking mechanism in a trunk or storage area of the vehicle, a water bar detachably connected to the docking mechanism, where the water bar includes a water container, a water dispenser, and a power unit that is suitable to power the water bar upon its detachment from the docking mechanism. The system may include a water dispensing unit in a cabin of the vehicle, and a pipe to connect the water bar to the water dispensing unit in the cabin so that when the water bar is docked in the docking mechanism, water from the water container in the water bar is pumped through the pipe to the water dispensing unit in the cabin, and when the water bar is removed from the docking mechanism, the power unit supplies power to the water bar. Other fluids or beverages may be used, stored, cooled or heated in the system, such as beer, soda, juices, or combinations thereof.

In some embodiments the removable water bar includes a water cooling element and a water heating element, and the power unit supplies power to one or both such elements. In some embodiments the water dispensing unit in the cabin includes a signal input device such as a switch, lever or button to activate a pump to pump water through the pipe.

In some embodiments the system includes a reverse pump activator to activate a pumping of water through the pipe back to the water container. In some embodiments, the docking mechanism includes a connector to connect an outlet of the water bar to the pipe. In some embodiments, the docking mechanism includes a connector to conduct power from the vehicle to the power source. In some embodiments, the water dispenser in the cabin includes a signal input device to accept a selection of cold water and hot water.

In some embodiments, the water bar includes a signal input device to accept a selection of cold water and hot water. In some embodiments, the water bar includes a filling hole to accept water for storage in the water container.

In some embodiments, a system may include a portable water bar that has a docking mechanism, the water bar detachably connected to the docking mechanism fixed to an inside of a vehicle such as an automobile, where the water bar includes a water container, a water dispenser, a heat transfer unit and a power unit to power the water bar upon its removal from the docking mechanism; and where the power unit is detachably connected to a power unit in the automobile.

In some embodiments, the water bar, when docked in the docking mechanism, provides water to a water dispensing unit in a cabin of the vehicle. In some embodiments, the water bar includes a handle suitable for lifting it from the docking mechanism. In some embodiments, the water container includes a cold water container and a hot water container. In some embodiments, the system includes a heat transfer unit that includes a water heating unit and a water cooling unit.

Embodiments of the invention include a method of dispensing water stored in a vehicle, where a method includes docking a water bar in a docking mechanism that is secured in a trunk or storage area of the vehicle, pumping heated water from the water bar in the docking mechanism to a water dispensing unit in a cabin of the vehicle; and heating water in the water bar when the water bar is removed from the docking mechanism.

Some embodiments include supplying power from the automobile to the water bar in the docking mechanism. Some embodiments include supplying power to the water bar from a power source in the water bar when the water bar is removed from the mechanism. Some embodiments include issuing a signal to the water bar from within the cabin of the vehicle to pump water from the water bar to the water dispensing unit in the cabin of the vehicle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
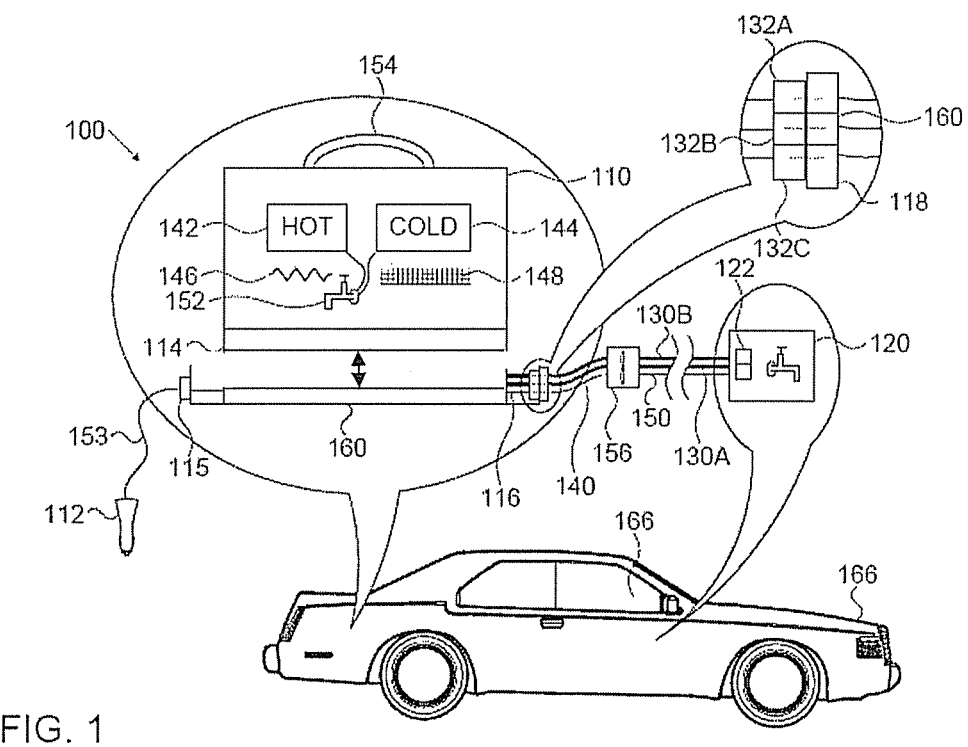
FIG. 1 is schematic diagram of a removable water dispensing system for automobiles according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Reference is made to FIG. 1, a removable water dispensing system 100 for a vehicle such as an automobile according to an embodiment of the invention. System 100 may include a removable or detachable water bar 110, a fixed water dispensing unit 120 in the car cabin 166, and a water conduction system 130 such as a pipe or hose.

System 100 may include a cable 150 detachably connected to removable water bar 110, and an input signal conveyance mechanism 122, such as a button, switch, lever or other signal input device, over which a user may issue a signal to receive water, or may indicate or select from cool or hot water that is to be dispensed. In some embodiments, system 100 may include a connection from a power unit 112 of the car to a power source 114 of the water bar 110. Power source 114 may be detachably connected to power unit 112. System 100 may include a docking station 160 to detachably fix, dock, secure, or hold the bar 110 in or to a storage space in an automobile, such as for example in a trunk of a car or storage space of a boat, bus, plane or other vehicle. Docking station 160 may be fixed or secured in a trunk or other storage area of a car or automobile, and may be permanently or detachably connected to a part of the car. Docking station 160 may include one or more sockets or connectors such as a power connector 115 that connects the docking station to a wire 153 to a car's power supply, and that may allow a connection of an electrical or signal connector 116 and a water connector 118. Bar 110 may be connected by way of signal connector 116 of docking station 160 and a signal transmitter, such as a wire or other cable 150 to associated with signal input device 122, button or lever associated with unit 120, to receive control instructions from dispensing unit 120. Control instructions may be received by bar 110 directly and not through docking station 160.

Bar 110 may include one or more water containers such as a hot water container 142 and a cold water container 144, as well as one or more heat transfer elements such as heating element 146 and cooling element 148. Bar 110 may also include a tap or faucet 152 by which a user may receive water from bar 110. Bar 110 or unit 120 may include storage space for coffee, tea, sugar and other beverage materials.

Water conductor system 130 may include a hot water pipe 130A to conduct hot water from bar 110 to water dispensing unit 120, and a cold water pipe 130B to conduct cold water from bar 110 to unit 120. According to some embodiments of the present invention, each of water pipes 130A and 130B may be connected at one end to water dispensing unit 120 and at the other end to removable water bar 110 via a releasable connector 132A and 132B respectively. Cable 150 may also be connected to a quick release connector 132C. Such quick release connectors may allow a connection of the respective pipes 130A and 130B and wires 150 and 153 to bar 110 upon insertion or docking of bar 110 into docking mechanism 160, without necessitating each of such connections to be connected individually. Bar 110 and unit 120 may include hot water safety devices to protect users such as children from hot water.

In operation, docking mechanism 160 may be installed and secured into, for example, a trunk of a car or automobile. Docking mechanism 160 may hold bar 110 and provide connections between and bar 110 and one or more of pipes 130A and 130B, wire 150 and wire 153. When bar 110 is in docking mechanism 160, a user of unit 120 may issue a signal by way of signal device 122, and water may flow from containers 142 and 144 through pipes 130A and 130B to unit 120. Bar 110 may be removed or lifted out of docking mechanism 160, by way of for example handle 154. When removed, the connections provided by docking mechanism 160 may be detached, and bar 110 may function as a portable, stand alone water bar. When so removed, power source 114 may continue to provide power to operate bar 110, and may provide power for heating element 146, cooling element 148 and in some embodiments faucet 152. When so removed, hot and cold water may be dispensed directly from bar 110 via faucet 152. Bar 110 may be reinstalled or docked in docking mechanism 160, and the connections to pipes 130A, 130B and wires 150 and 153 may be restored.

Pipes 130A and 130B may be made of a flexible material, such as silicon, or any other flexible material known in the art, and may be insulated.

System 100 may include one or more pumps 156 that may pump water to and from unit 120. Signals from signal input device 122 may activate pump 156 and may reverse a direction of water pumped by pump 156.

Wire 153 may be connected at one end to a power source, such as a battery or electrical system of a vehicle, through, for example, a 12V car lighter plug to power unit 112 or through some other connection. Wire 153, wire 150 and pipes 130A and 130B may be detachably connected to bar 110, without going through docking station 160. Is some embodiments, wire 150 may be connected, in a detachable manner, directly to removable water bar 110. According to other embodiments, power cable 150 may be connected to docking station 160, and docking station 160 may energize removable water bar 110, through a power connector (not shown).

In some embodiments, bar 110 may receive power and control instructions via docking station 160, thus eliminating the need to disconnect bar 110 from power cable 150 and from control wire 140 when disengaging bar 110 from docking station 160. Docking station 160 may include easy release connectors for release of connection of removable water bar 110 from docking station 160.

Figure 2:
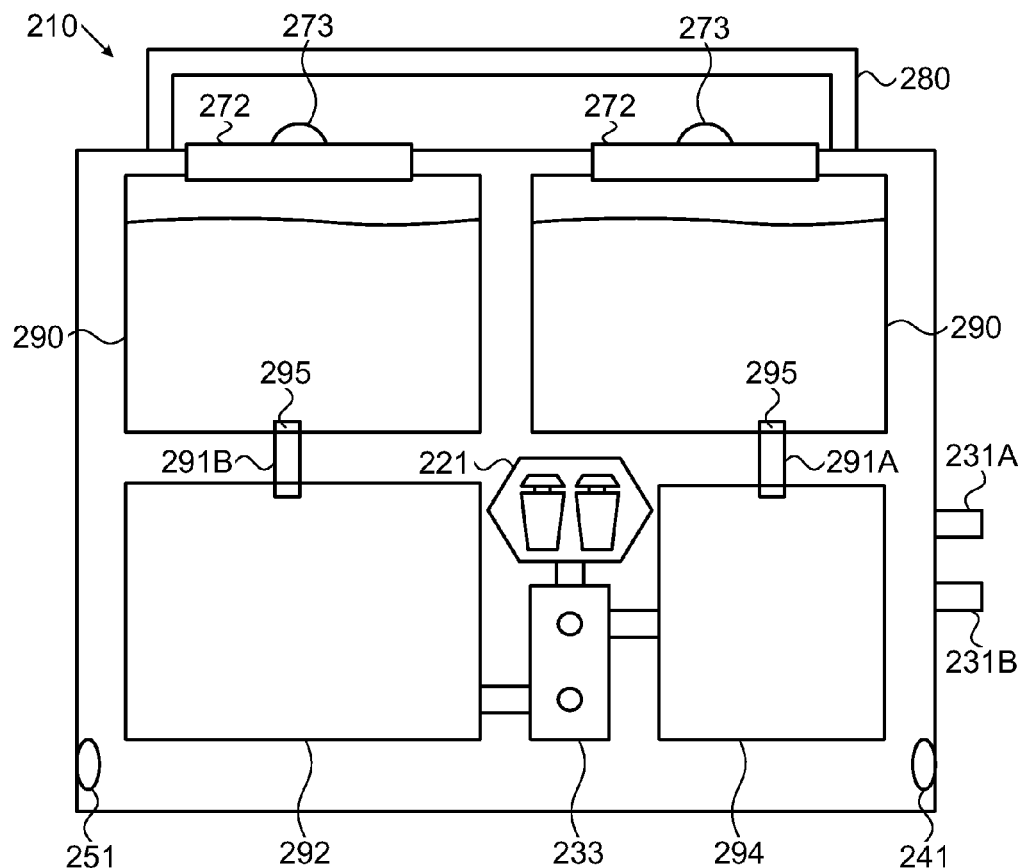
FIG. 2 is a schematic diagram of a removable water bar according to an embodiment of the invention.

Reference is made to FIG. 2, a detailed illustration of a removable water bar 210 according to embodiments of the invention. Removable water bar 210 may have at least one water container 290 (in FIG. 2, a double container configuration is illustrated), a thermoelectric water cooling tank 292, and a water boiler 294.

Water container(s) 290 may be connected to water cooling tank 292 via water channel 291B and to water boiler 294 via water channel 291A.

In some embodiments, water channels 291A and 291B may include a unidirectional valve to prevent back flow of water from water boiler 294 and from cooling tank 292, respectively, to water container(s) 290.

In some embodiments, water container(s) 290 may be disposable and replaceable. Water container(s) 290 may be refillable through refilling opening 272. Refilling opening 272 may be closed by a removable cap 273. Cap 273 may be, for example, a screw cap, a pressure cap, or any other type of removable cap known in the art. In some embodiments, water container(s) 290 may have at least one drain outlet 295. Drain outlet 295 may be an opening in one surface of water container 290 sealed by a tearable cover. In some embodiments, when water container 290 is inserted into removable water bar 210, at least one of water channels 291A, 291B may penetrate into drain outlet 295 and tear the cover sealing it, thus allowing water to flow from container 290 to boiler 294 and/or cooling tank 292.

In some embodiments, drain outlet 295 may include a flexible non-tearable cover that, when engaged by water channels 291A, 291B, may be pushed in to allow water flow from container(s) 290 to cooling tank 292 and/or boiler 294, and when container(s) 290 is removed from removable water device, the flexible cover may bounce back and seal the opening of drain outlet 295.

In some embodiments, water container(s) 290 may have a single opening used both as a refilling opening 272 and as drain output 295. In such an embodiment, cap 273 may include a flexible material acting as a valve, allowing water flow when engaged with any of water channels 291A and/or 291B, and preventing water flow when disengaged from water channels 291A, 291B.

Removable water bar 210 may include at least one bidirectional pump 233 to pump water from cooling tank 292 and from boiler 294 to water dispenser unit (120 in FIG. 1) through pipes (130A and 130B in FIG. 1, respectively). In some embodiments, two pumps 233 may be used, so that one pump is for pumping hot water from boiler 294 through hot water pipe 130A (in FIG. 1) and a second pump is for pumping cold water from cooling tank 292 through cold water pipe 130B (in FIG. 1).

In some embodiments, pump(s) 233 may be bidirectional, to allow pumping water from cooling tank 292 and boiler 294 to dispensing unit (120 in FIG. 1) and to withdraw water from water conduction system (130 in FIG. 1) back to cooling tank 292 and boiler 294, to keep conduction system empty when not in use.

In some embodiments, removable water bar 210 may include a power socket 251 to receive power from a power source (not shown), and a control inlet 241. Control inlet 241 may receive a control wire (140 in FIG. 1).

Removable water bar 210 may include a hot water quick release connector socket 231A and a cold water quick release connector socket 231B. Both quick release connector sockets 231A and 231B may include a bidirectional pressure valve to allow water flow through sockets 231A, 231B toward dispensing unit 120 (in FIG. 1) and back from conduction system 130 (in FIG. 1) to boiler 294 and cooling tank 292, respectively.

In some embodiments, removable water bar 210 may include water taps 221 to allow usage of removable water bar 210 as an independent, portable device, when disconnected from water dispensing system 100 (in FIG. 1). When removable water bar 210 is operated as independent water dispensing device, a secondary portable power source such as a lead acid battery, a lithium-ion (Li-Ion) battery, or other heavy duty and rechargeable or non-rechargeable battery known in the art, may be used. Removable water bar 210 may remain connected to a primary power source, such as a vehicle's battery, through power cable 150 (in FIG. 1) even when detached from docking station 160 (in FIG. 1). In some embodiments, the secondary power source may be recharged when removable water bar 210 is fixed in docking station 160.

According to some embodiments of the present invention, removable water bar 210 may include connectors or splines to detachably connect to docking station (160 in FIG. 1). Removable water bar 210 may include connectors to power socket and control socket at docking station (160 in FIG. 1).

In some embodiments, removable water bar 210 may include a carry handle 280. According to some embodiments, handle 280 may be foldable so as to lie flush with a top surface of bar 210 when not in use, and may be raised to lift water bar 210 from docking station 160.

Figures 3A, 3B:
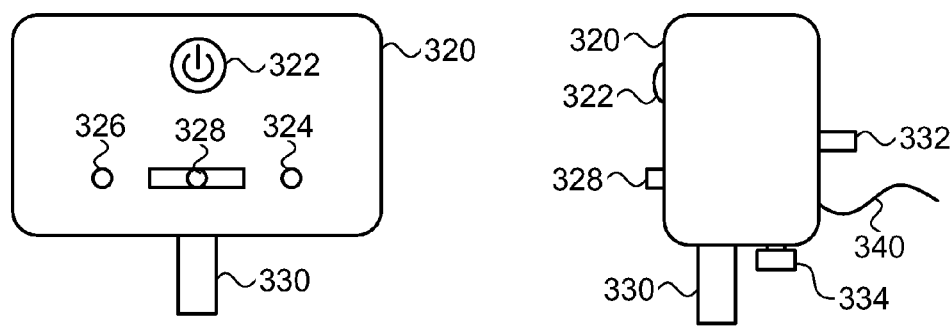
FIGS. 3A and 3B are front and side views, respectively, of a fixed dispensing unit according to an embodiment of the present invention.

Reference is now made to FIGS. 3A and 3B, which are front and side views (respectively) of a fixed water dispensing unit 320. Fixed water dispensing unit 320 may be fixed at a reachable location within the interior of a passengers' cabin of an automobile, such as the dashboard of a vehicle. Other locations may be selected.

In some embodiments, unit 320 may include an on/off button 322, an operation mode switch 328, for selecting the operational mode (e.g., hot water mode, cold water mode or mixed water mode) of dispensing unit 320 (and of water dispensing system 100 in FIG. 1), a dispensing actuator 334 and a water outlet 330. Dispensing unit 320 may include a double entry water inlet 332. In some embodiments, dispensing unit 320 may be connected to, either detachably or non-detachably, control wire 340 (and 140 in FIG. 1) to allow control instructions, such as "pump hot water to dispensing unit 320", to be transferred from unit 320 to bar 210.

In some embodiments, dispensing actuator 334 may be located at the lower face of dispensing unit 320, behind water outlet 330. Such a location for actuator 334 may allow operating actuator 334 by the edge of a vessel, such as a cup or a bottle, and prevent water dispensing when a vessel is not placed under water outlet 330. Actuator 334 may be located in other locations, such as on the front face of dispensing unit 334.

In some embodiments, dispensing unit 334 may include one or more indicators 324, 326 to indicate the mode and state of water dispensing system 100. In the embodiment depicted in FIG. 3A, two indicators 324, 326 are illustrated. Other number of indicators may be used. In an embodiment, indicators 324, 326 may be Light Emitting Diodes (LED's) in various colors (e.g., blue and red). In some embodiments, the state of an indicator may be indicative of a different operation mode. For example, indicator 324 being lit and indicator 326 being turned off may indicate that water dispensing system is in the hot water dispensing mode, while both indicators 324 and 326 being lit may indicate that water dispensing system 100 is in a mixed water mode. In another example, a blinking indicator may indicate that the water level in boiler 294 (in FIG. 2) or cooling tank 292 (in FIG. 2) has reached a predefined minimum level.

According to some embodiments, indicators 324 and/or 326 may be a display, such as an LCD display, to provide an indication of the mode and state of water dispensing system 100. For example, an LCD indicator may provide information regarding water level in container(s) (290 in FIG. 2) and/or in cooling tank 292 and/or boiler 294.

Figure 4:
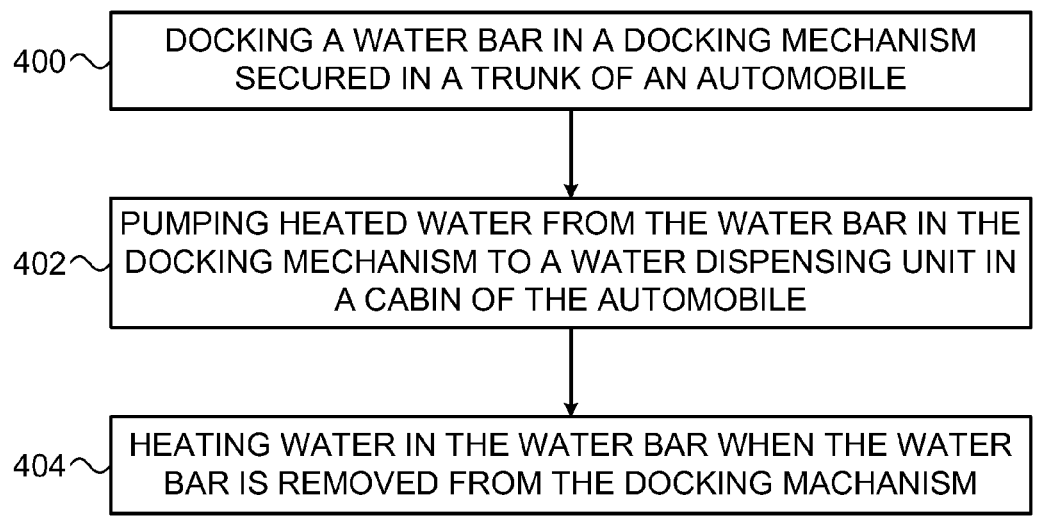
FIG. 4 is a flow diagram of a method in accordance with an embodiment of the invention.

Reference is made to FIG. 4, a flow diagram in accordance with an embodiment of the invention. In block 400, a water bar may be docked in a docking mechanism that is secured in a trunk of said automobile. In block 402, heated water may be pumped from the water bar in the docking mechanism to a water dispensing unit in a cabin of the automobile. In block 404, water may be heated in the water bar when the water bar is removed from the docking mechanism.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A water dispensing system for an automobile comprising: a water dispensing unit in a cabin of said automobile; a water bar detachably connected to a docking mechanism, said water bar including a water container, a water dispenser, and a power source, said power source configured to power said water bar upon detachment of said water bar from said docking mechanism, said docking mechanism in a storage area of said automobile, said docking mechanism including a connector to connect an outlet of said water bar to a pipe; said pipe connecting said water bar to said water dispensing unit in said cabin; wherein, upon said water bar being in said docking mechanism, water from said water container is pumped through said pipe to said water dispensing unit in said cabin.

2. The system according to claim 1, wherein said removable water bar comprises a water cooling element and a water heating element, and wherein said power source supplies power to said elements.

3. The system according to claim 1, wherein said water dispensing unit in said cabin comprises a signal input device, wherein said signal input device activates a pump, and said pump pumps water through said pipe from said water container to said water dispensing unit.

4. The system as in claim 3, wherein said signal input device is further configured to activate said pump to pump of fluid through said pipe from said dispensing unit back to said water container.

5. The system according to claim 1, wherein said water dispenser in said cabin comprises a signal input device to accept a selection of cold water and hot water.

6. The system according to claim 1, wherein said water bar comprises a handle by which said water bar may be lifted.

7. The system as in claim 1, wherein said water bar comprises a signal input device to accept a selection of cold water and hot water.

8. The system as in claim 1, wherein said water bar comprises a filling hole, said hole suitable to accept water for storage in said water container.

9. A system comprising a portable water dispenser, the system comprising: a docking mechanism fixed to an inside of an automobile, and a water bar detachably connected to said docking mechanism, said water bar including a water container, a water dispenser, a heat transfer unit and a power source, said power source to power said water bar upon a removal of said water bar from said docking mechanism, and said docking mechanism comprising a connector to conduct power from said automobile to said power source; and wherein said power source is detachably connected to a power unit in said automobile.

10. The system as in claim 9, wherein said water bar, when connected to said docking mechanism, provides water to a water dispensing unit in a cabin of said automobile.

11. The system as in claim 9, wherein said water bar comprises a handle suitable for use in detaching said water bar from said docking mechanism.

12. The system as in claim 9, wherein said water container comprises a cold water container and a hot water container.

13. The system as in claim 9, wherein said heat transfer unit comprises a water heating unit and a water cooling unit.

14. A method of dispensing water stored in an automobile, comprising: docking a water bar in a docking mechanism, said docking mechanism secured in a storage area of said automobile; pumping heated water from said water bar in said docking mechanism through a connector of said docking mechanism, said connector connecting an outlet of said water bar to a pipe, said pipe connecting said water bar to a water dispensing unit in a cabin of said automobile; heating water in said water bar when said water bar is removed from said docking mechanism; wherein said heating water when said water bar is removed from said docking mechanism comprises supplying power to said water bar from a power source in said water bar.

15. The method as in claim 14, comprising supplying power from said automobile to said water bar in said docking mechanism so as to heat fluid in said water bar when said water bar is attached to said docking mechanism.

16. The method as in claim 14, comprising removing said water bar from said docking mechanism by lifting said water bar from said docking mechanism.

17. The method as in claim 14, comprising issuing a signal to said water bar from within said cabin of said automobile to pump water from said water bar to said water dispensing unit in said cabin of said automobile.

* * * * *